United States Patent [19]
Roussy et al.

[11] Patent Number: 5,884,139
[45] Date of Patent: Mar. 16, 1999

[54] GAS PHASE CATALYTIC REACTOR

[75] Inventors: Georges Roussy, Laxou; Bernard Maestrali, Fontainebleau; Jean-Marie Thiebaut, Heillecourt; Eric Marchal, Vandoeuvre les Nancy, all of France

[73] Assignee: Electricite De France Service National, Paris, France

[21] Appl. No.: 727,167

[22] Filed: Oct. 7, 1996

[30] Foreign Application Priority Data

Oct. 9, 1995 [FR] France ................................ 95 11863

[51] Int. Cl.[6] ............................................. B01J 19/08
[52] U.S. Cl. ............................................................ 422/186
[58] Field of Search ................................. 422/186; 502/5

[56] References Cited

U.S. PATENT DOCUMENTS

| | | | |
|---|---|---|---|
| 4,107,226 | 8/1978 | Ennis, Jr. et al. ...................... | 260/683 |
| 5,254,231 | 10/1993 | Heath et al. ............................ | 204/165 |
| 5,282,886 | 2/1994 | Kobayasji et al. ..................... | 95/131 |
| 5,411,649 | 5/1995 | Roussy et al. ......................... | 204/157.43 |

FOREIGN PATENT DOCUMENTS

| | | |
|---|---|---|
| 2554014 | 3/1985 | France . |
| 2696447 | 8/1994 | France . |
| 561048 | 9/1932 | Germany . |
| 4336503 | 10/1993 | Germany . |
| 2071970 | 9/1981 | United Kingdom . |
| 2102402 | 2/1983 | United Kingdom . |

OTHER PUBLICATIONS

J.M. Thiebut et al., Microwave Catalytic Activation of Methane, Oct. 1991, pp. 253–256.

J.M. Thiebut et al, Installation D'Irradiation Microonde Des Catalyseurs Dielectriques et D'Etude Des Reactions, Journal de chimie physique, May 1988, 85, No. 7/8.

*Primary Examiner*—Kishor Mayekar
*Attorney, Agent, or Firm*—Henderson & Sturm

[57] ABSTRACT

A gas phase catalytic reactor comprising a metal vessel defining a confinement volume in which electromagnetic waves are generated at a frequency greater than 10 MHz. The confinement volume contains a porous catalyst which is heated by the electromagnetic waves and which has a flow of reactive gas passing therethrough. In order to guarantee that the gas reacts only when in contact with the catalyst, a heat exchanger is used to cool the gas suddenly as it leaves the confinement volume.

9 Claims, 3 Drawing Sheets

GAS PHASE CATALYTIC REACTOR

FIELD OF THE INVENTION

The invention relates to gas phase catalytic reactors, and amongst such reactors, it relates more particularly to a reactor comprising:

a metal vessel defining at least part of a wave confinement volume;

wave generation means for emitting electromagnetic waves into said confinement volume at a frequency greater than 10 MHz;

a porous dielectric catalyst disposed in said wave confinement volume, said catalyst being adapted to heat by absorbing energy coming from said electromagnetic waves;

a gas inlet for injecting a reactive gas into the wave confinement volume; and a gas outlet communicating with the wave confinement volume, the reactor being shaped so that all of the reactive gas injected via the above-mentioned gas inlets passes through the catalyst before leaving via the gas outlet.

PRIOR ART OF THE INVENTION

Examples of experimental reactors of the kind in question are described, inter alia, in document FR-A-2 696 447 and in an article entitled "Installation d'irradiation micro-onde des catalyseurs diélectriques et d'étude des réactions" [An installation for microwave irradiation of dielectrical catalysts, and for studying reactions] (J. M. THIEBAUT, H. AMMOR, G. ROUSSY, Journal de Chimie Physique, 1988, 85, No. 7–8, pp. 799–806).

Such reactors can be used, particularly, but not exclusively, for implementing chemical coupling reactions in which methane is catalytically oxidized for the purpose of obtaining organic compounds having two or more carbon atoms, referred to below as $C_2+$ compounds.

A major difficultly in performing coupling reactions catalytically with methane or in performing similar reactions is obtaining sufficiently high selectivity, i.e. a sufficiently high ratio between the number of methane molecules that are transformed into $C_2+$ molecules and the total number of methane molecules involved in the reaction.

OBJECT AND BRIEF SUMMARY OF THE INVENTION

The present inventors have discovered that high values of selectivity can be obtained by cooling the gas suddenly as soon as it leaves the wave confinement volume so as to prevent the gas from continuing to react outside the confinement volume, and to do this without disturbing the operation of the reactor in spite of the conflict between heating the catalyst and immediately cooling the gas.

To this end, according to the invention, a catalytic reactor of the kind in question is essentially characterized in that it further comprises a heat exchanger device which is disposed outside the wave confinement volume immediately downstream from the gas outlet, and which is adapted to cool the gas suddenly by transferring heat to a cooling liquid at least as soon as the gas leaves the wave confinement volume, and in that the gas outlet is shaped so as to avoid heating the vessel in the presence of electromagnetic waves generated in the wave confinement volume: in this way, a gas-quenching effect is obtained immediately after the gas has reacted.

It can thus be ensured that the gas substantially ceases to react any more after it has left the catalyst, given the speed of the gas and the kinetics of the reactions to be avoided on leaving the catalyst.

Also, the above-explained dispositions make it possible to achieve a judicious compromise between catalyst heating and rapid cooling of the gas.

Even if the heat exchanger device tends to cool a portion of the vessel, the above-mentioned dispositions do not disturb the energy budget of the reactor since the electromagnetic waves do not themselves give rise to significant heating of the vessel, but only heating in the mass of catalyst, unlike conventional systems that heat by thermal conduction. This cooling of the vessel also contributes to the gas quenching effect.

Also, because catalysts generally absorb more electromagnetic energy when they are hot, these dispositions contribute to maintaining a non-uniform temperature distribution within the catalyst, so that there is both a hot zone where catalytic reaction takes place under optimum conditions and a cold zone where catalytic reaction does not take place, thereby further contributing to improving the selectivity of the reaction since the reaction takes place only in optimum condition zones. In addition, the cold zone in question can contribute to quenching the gas.

Finally, it should be observed that the reactor of the invention is particularly effective in avoiding runaway of the chemical reaction in the gas when the reaction is highly exothermal: firstly it is possible for heating of the catalyst by the wave generator means to be interrupted or diminished instantly, and secondly the heat exchanger device can contribute to removing any excess heat energy.

Naturally, the above dispositions do not apply solely to a catalytic reactor designed to implement a coupling reaction in which methane is oxidized; they apply on the contrary to any gas phase catalytic reactor in which it may be advantageous to quench the gas after the reaction.

In preferred embodiments, use is also made of one or more of the following dispositions:

the catalyst is disposed immediately upstream of the gas outlet from the wave confinement volume;

the vessel extends along a longitudinal axis between two ends and comprises a substantially tubular outside metal wall extending along the longitudinal axis between the two ends of the vessel, said outside wall having, substantially halfway between said two ends, an annular central length provided with slots which are parallel to the longitudinal axis and which constitute the gas outlet from the wave confinement volume, said central length of the outside wall being surrounded by a gas collecting chamber in thermal contact with the heat exchanger device, which is itself disposed around said central length of the outside wall; the vessel also comprising an inside metal core which is disposed substantially in the center of the outside wall and which also extends along the longitudinal axis between the two ends of the vessel, the core presenting a hollow central length in the central length of the outside wall and provided with openings which constitute the gas inlet to the wave confinement volume, the core of the vessel being hollow between its central length and one of the ends of the vessel and defining a gas feed duct which communicates with said enlarged central portion of the core, and the core of the vessel having an electrical length equivalent to half the wavelength of the electromagnetic waves generated in the vessel; and the vessel finally comprising two metal end walls which connect together the core and the outside wall of the vessel at the two ends of said vessel; the wave confinement volume being an annular space extending radially between the outside wall and the core of the vessel, the catalyst being disposed between said central lengths of the core and of the outside wall of the vessel, and the wave generator means including a high frequency electrical generator which is connected to the vessel via a coaxial cable having an outer conductor connected to the outside wall of the vessel and an inner conductor connected to the core of the vessel;

the core of the vessel is wound helically at either end of its central length, such that the total length of the vessel is much shorter than half the wavelength of the electromagnetic waves generated inside said vessel;

the catalyst extends axially between two radial annular plates that interconnect in sealed manner the core of the vessel and the outside wall of said vessel, the two annular plates being made of a dielectric material that is transparent to the electromagnetic waves generated in the wave confinement volume;

the vessel is a rectangular section waveguide having an inside space constituting the wave confinement volume and including two narrower faces and two wider faces, one of the narrower faces referred to as the outlet face having slots each extending parallel to the width of said outlet face and constituting the outlet from the wave confinement volume, said slots opening out into a gas collection chamber in thermal contact with the heat exchanger device which is disposed at least facing said slots; the catalyst being disposed inside the waveguide as a layer covering the outlet face of the waveguide, at least over the slots; and the wave generation means being designed to generate electromagnetic waves presenting an electric field parallel to the slots of the outlet face;

the vessel includes a substantially tubular outside metal wall which extends along a longitudinal axis between first and second ends, said outside wall being disposed around a central metal core which extends along the longitudinal axis between first and second ends respectively close to the first and second ends of the outside wall, the second end of the outside wall extending beyond the second end of the central core; the wave confinement volume being an annular space which extends between the outside wall and the central core and which is defined axially at one end by the second end of the central core, the outside wall including, at said second end of the central core, an inside section which constitutes the gas outlet from the wave confinement volume; the outside wall of the vessel presenting, in the immediate vicinity of the gas outlet and inside the wave confinement volume, an inside section that is completely occupied by the catalyst, which forms a layer extending radially between the outside wall and the central core of the vessel; the outside wall of the vessel forming, between its second end and the second end of the central core, a gas collection chamber which is in thermal contact with the heat exchanger device; and the wave generating means comprising a high frequency electrical generator connected to the vessel by a coaxial line having an outer conductor connected to the outside wall of the vessel and an inner conductor connected to the central core of the vessel;

the reactor further includes a porous plate of dielectric material which occupies the entire section constituting the gas outlet from the wave confinement volume, said porous plate being disposed directly in contact with the catalyst; and the vessel is constituted by a metal wall in the form of an ellipsoid of revolution, having first and second focuses, a catalyst in the form of a mass of material disposed about the first focus and fed internally by a gas feed duct constituting the gas inlet to the wave confinement volume; the wave generator means including an antenna disposed substantially at the second focus of the vessel; and the gas outlet from the wave confinement volume opening out into a gas collection chamber which is in thermal contact with the heat exchanger device.

BRIEF DESCRIPTION OF THE DRAWINGS

Other characteristics and advantages of the invention appear from the following detailed description of various embodiments, given as non-limiting examples, and described with reference to the accompanying drawings.

In the drawings.

MORE DETAILED DESCRIPTION

Figure 1:
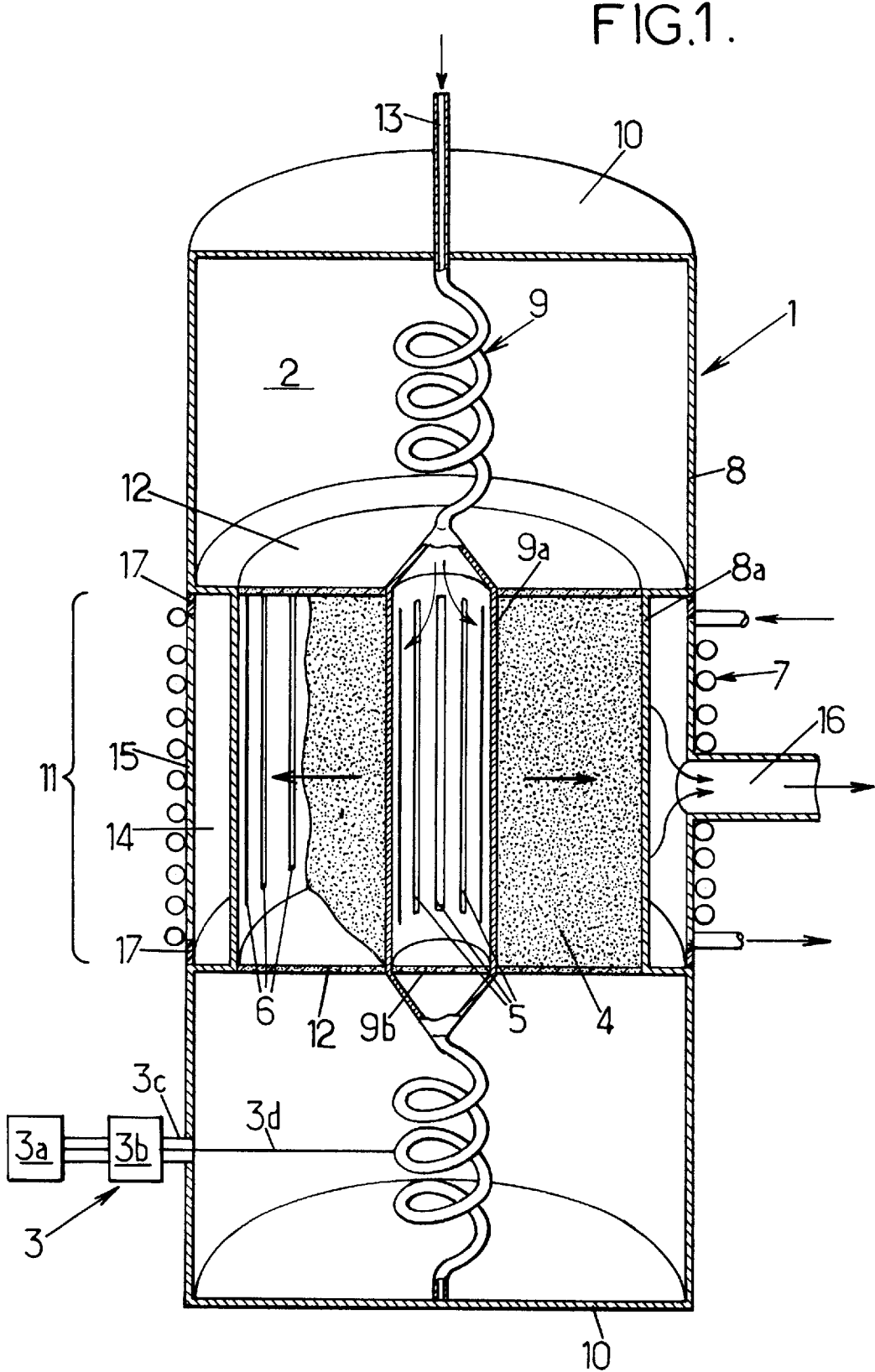
FIG. 1 is a diagrammatic perspective view partially in longitudinal section of a reactor comprising a first embodiment of the invention.

In the various figures, the same references designate elements that are identical or similar.

In all of the embodiments described below, the gas phase catalytic reactor comprises:

a metal vessel respectively 1, 21, 41, or 61 defining a wave confinement volume, respectively 2, 22, 42, or 62;

wave generator means, respectively 3, 23, 43, or 63 for emitting into said confinement volume electromagnetic waves at a frequency greater than 10 MHz, and in particular waves at a frequency lying in one of the following ranges: 13.56±0.017 MHz, 27.12±0.07 MHz, 433.92±0.8 MHz, 915±15 MHz, 2450±50 MHz, and 5800±74 MHz;

a porous dielectric catalyst, respectively 4, 24, 44, or 64 located inside said wave confinement volume, the catalyst being adapted to heat up (e.g. to a temperature of 600° C. to 800° C.) by absorbing energy coming from said electromagnetic waves, and the catalyst possibly being constituted, for example, by a catalyst of the type described in above-mentioned document FR-A-2 696 447;

a gas inlet, respectively 5, 25, 45, or 65, for injecting reactive gas into the wave confinement volume, the reactive gas possibly being methane, for example;

a gas outlet, respectively 6, 26, 46, or 66, communicating with the wave confinement volume, the reactor being shaped so that all of the reactive gas injected via the above-mentioned gas inlet passes through the catalyst before leaving via the gas outlet; and a heat exchanger device, respectively 7, 27, 47, or 67, disposed outside the wave confinement volume immediately downstream from the gas outlet, and adapted to cool the gas suddenly by transferring heat to a cooling liquid, possibly also cooling the vessel of the reactor and a portion of the catalyst, the heat exchanger device possibly being constituted, for example, by a tube type heat exchanger, or a plate type heat exchanger, or by a device for vaporizing the cooling liquid, and the cooling liquid possibly being water, for example.

In all cases, the gas is cooled soon enough after leaving the catalyst not to have enough time to suffer from parasitic chemical reactions outside the catalyst, given the kinetics of said reactions.

In the embodiment of the invention shown in FIG. 1, the vessel 1 has an outer metal wall 8 and a central inside core 9 which is also made of metal, the core and the wall being connected together at their axial ends by two metal closure walls 10 defining between them an annular space constituting the wave confinement volume 2.

Electromagnetic waves are generated in the wave confinement volume by the wave generator means 3 which comprise a high frequency electrical generator 3a, generally connected to a matching circuit 3b, itself connected to the vessel via a coaxial line which comprises both an outer conductor 3c connected to the outside wall 8 of the vessel and an inner conductor 3d connected to the core 9 of the vessel.

The core of the vessel has an electrical length equivalent to half the wavelength $\lambda$ of the waves generated in this way in the vessel. In other words, either the core 9 is rectilinear, in which case the vessel 1 has an axial length equal to $\lambda/2$, or else the core 9 is wound up helically towards one of its ends, forming a plurality of turns (as shown in FIG. 1) in which case it is the "unwound" length of the core 9 that is equal to $\lambda/2$, so the axial length of the vessel 1 can then be much smaller than $\lambda/2$.

By means of these dispositions, the vessel 1 is equivalent to a coaxial line of length $\lambda/2$, which is short-circuited at both ends.

As a result, there pevails obtains inside the wave confinement volume 2 an electromagnetic field which is zero at each of the closure walls 10 and which is at a maximum in the middle of the axial length of the vessel 1.

That is why the catalyst 4 is disposed in a central length 11 of the vessel near the middle of the axial length of said vessel, with the catalyst forming an annular layer extending radially between the outer wall 8 and the core 9 of the vessel.

The catalyst 4 is preferably contained axially between two plates 12 of dielectric material, e.g. silica, said plates 12 being impermeable to the gas but being transparent to the electromagnetic waves generated inside the wave confinement volume 2, and said plates 12 extend radially all the way between the outer wall 8 and the core 9 of the vessel.

Level with the catalyst 4, the core 9 of the vessel preferably has an enlarged portion 9a, and said core is hollow, at least in its enlarged portion and all the way to one of its ends, thereby constituting a feed duct 13 for the reactive gas.

The portion of the core 9 which extends from the central portion 11 of the vessel remote from the gas feed duct 13 is closed by a-closure wall 9b, or else this portion of the core 9 can be solid.

In order to enable the gas feed duct 13 to communicate with the catalyst 4, the enlarged portion 9a of the core is provided all around its periphery with axial slots 5 which constitute the inlet for gas into the wave confinement volume 2. Because the slots 5 extend axially, they do not interfere with the electrical operation of the core 9, since the electrical currents conveyed by the core 9 are axial.

The slots 5 may possibly be replaced by openings of some other shape, e.g. circular: in which case, the openings cause the core 9 to heat up somewhat because they disturb the electric current lines in the core 9. Such heating can be useful in some cases for preheating the gas where it enters the catalyst 4.

In addition, the enlarged portion 9a of the core may optionally include an internal heating resistance element (not shown) for preheating the reactive gas before it penetrates into the catalyst 4.

Also, level with the catalyst 4, the outside wall 8 has a portion 8a that is preferably of smaller diameter and that likewise has axial slots 6 disposed around the vessel 1 to constitute an outlet passage for the gas from the confinement volume 2. Because the slots 6 extend axially, they do not disturb the current lines extending along the outside wall 8, and as a result these slots do not heat the wall 8.

The slots 6 open out radially to the outside into a gas collection chamber 14 defined on the outside by an annular metal wall 15 provided with an outlet orifice 16.

At its axial ends, the wall 15 is continuously connected to the outside wall 8 of the vessel via dielectric material 17.

The tube type heat exchanger 7 is disposed outside the gas collecting chamber 14 in contact with the metal wall 15 so as to cool the gas immediately on leaving the slots 6.

The heat exchanger 7 may optionally also be disposed directly inside the gas collecting chamber 14.

Figure 2:
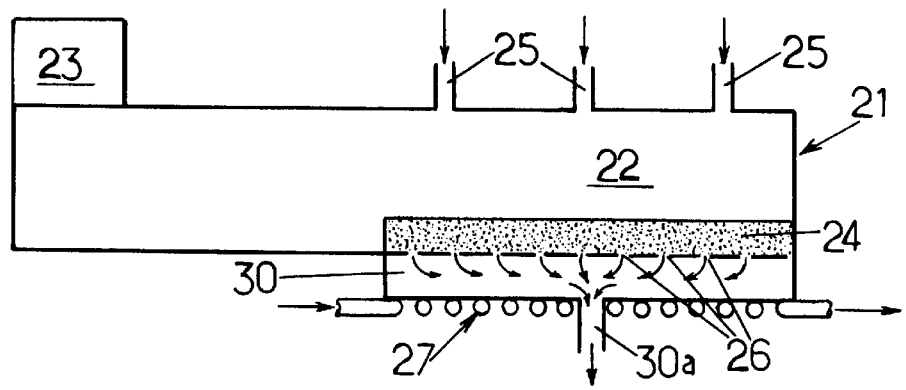
FIG. 2 is a diagrammatic longitudinal section view of a reactor comprising a second embodiment of the invention.
Figure 3:
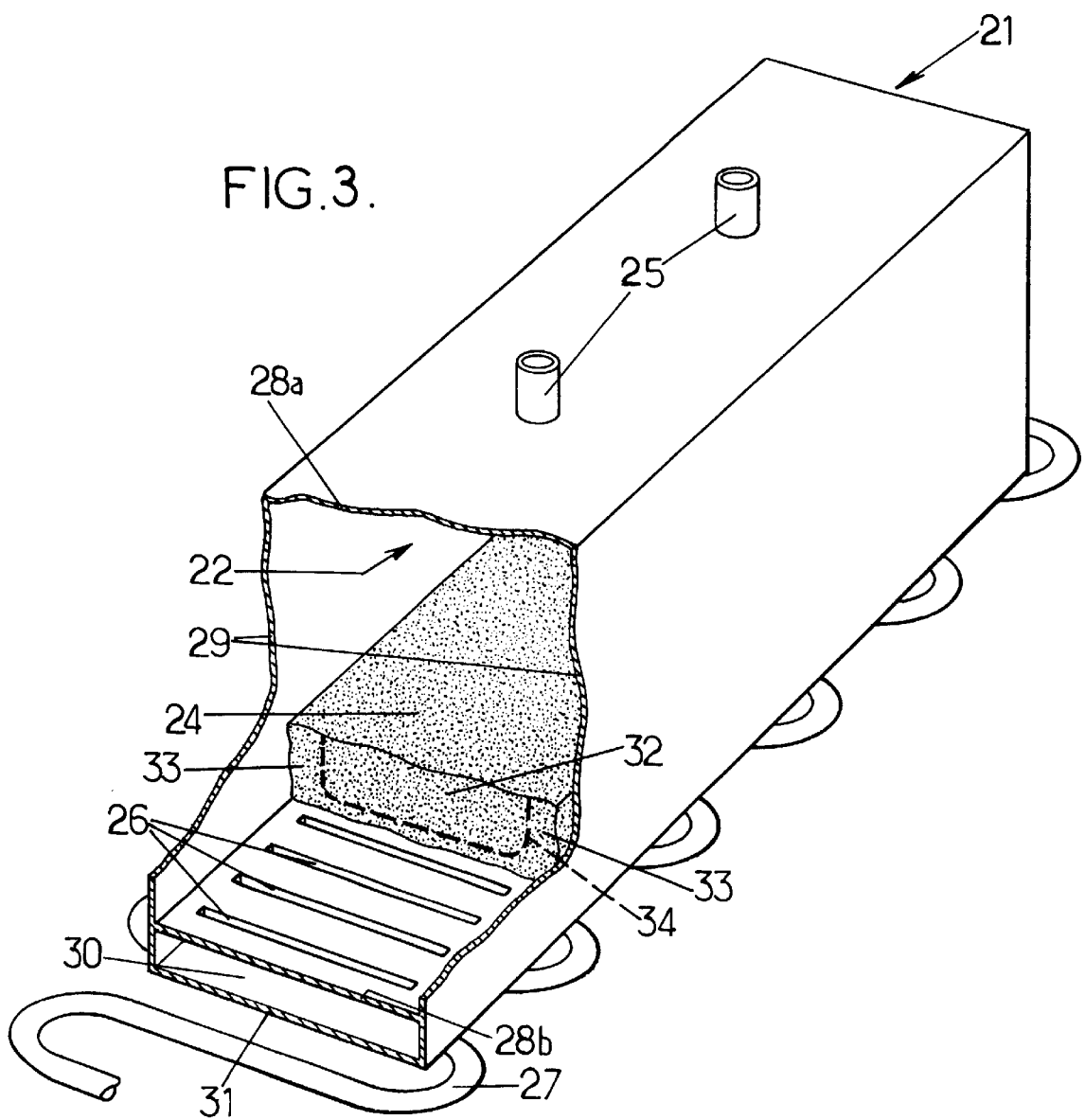
FIG. 3 is a cutaway perspective view of the FIG. 2 reactor.

In the embodiment of FIGS. 2 and 3, the vessel 21 is a rectangular section waveguide having an inside space constituting the wave confinement volume 22.

The waveguide 21 has two vertical faces 29 of relatively great width, and two horizontal faces 28a and 28b of relatively small width and respectively constituting a top face and a bottom face.

The wave generator means 23 emit TE01 type microwaves into the volume 22 having an electric field parallel to the width of the faces 28a and 28b of the waveguide, and the face 28b of the waveguide is provided with slots 26 (possibly defined between bars forming the face 28a) which constitute the gas outlet from the volume 22 and which are parallel to said electric field so as to avoid disturbing the electric current lines in the face 28b: this ensures that the microwaves do not heat the face 28b.

The slots 26 are covered by a layer of catalyst 24, and the waveguide also includes gas admission orifices 25 in its top face 28a (which orifices may optionally be in the form of slots parallel to the width of the face 28a), said orifices constituting the gas inlet to the volume 22.

Finally, the slots 26 open out into a gas collecting chamber 30 which communicates with a gas outlet orifice 30a and which is defined on the outside by a metal wall 31 that is continuously connected to the waveguide 21.

This wall 31 is in contact with a tube type heat exchanger 27, thereby enabling the gas to be cooled immediately on passing through the slots 26.

Where appropriate, the heat exchanger 27 could alternatively be located inside the gas collecting chamber 30.

The catalyst 24 generally has the property of absorbing electromagnetic waves better when hot, as applies to the other embodiments of the invention as well, said catalyst presenting a hot zone 32 occupying the major fraction of its section and a marginal cold zone 33 disposed in contact with the wall 28b and with the vertical walls 29 of the waveguide, which walls are cooled by thermal conduction given the presence of the heat exchanger 27.

The thermal gradient at the interface 34 between the hot zone and the cold zones is very great, such that the gas passing through the catalyst 24 encounters either catalyst that is hot enough for the reaction to take place in the gas under optimum conditions, or else catalyst that is cold enough for the gas not to react at all.

This behavior of the catalyst 24 promotes good selectively in the reaction, because in this way the gas which reacts on the catalyst always reacts under optimum conditions, and the gas which has not reacted can in any case be recycled.

Figure 4:
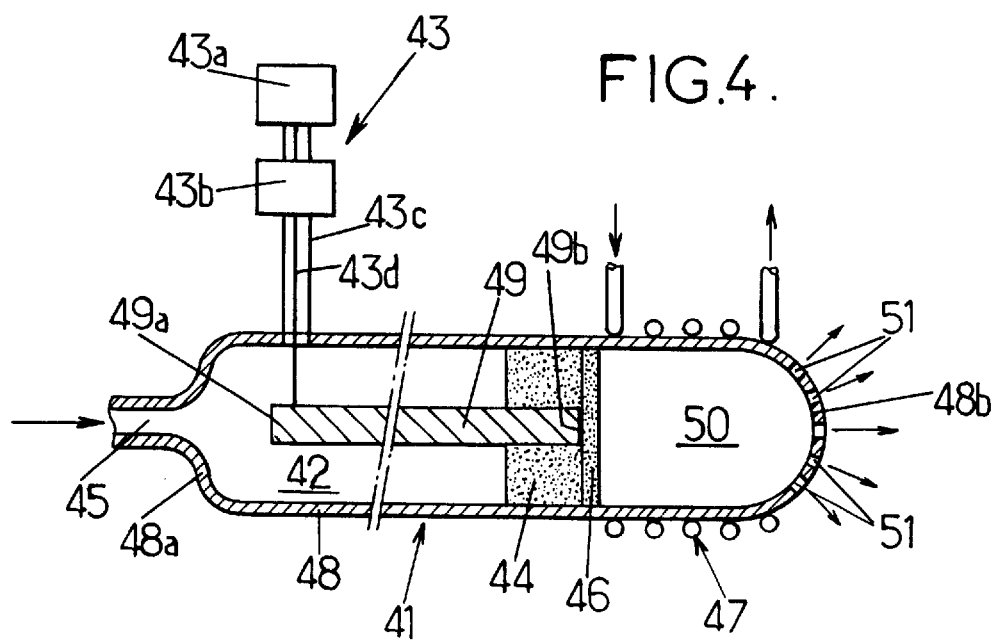
FIG. 4 is a diagrammatic longitudinal section view of a reactor constituting a third embodiment of the invention.

In the embodiment of FIG. 4, the vessel 41 has a substantially tubular outside metal wall 48 extending longitudinally between two ends 48a and 48b.

This outside wall is disposed around a central metal core 49 which itself extends longitudinally between two ends 49a and 49b that are close to the ends 48a and 48b respectively of the outside wall. By way of example, the central core 49 may be mounted in the outside wall 48 by means of supports made of dielectric material (not shown) having axial passages to pass the gas.

The wave generator means 43 comprise a high frequency electrical generator 43a which is connected to a matching circuit 43b, itself connected to the vessel by a coaxial line having an outer conductor 43c connected to the outside wall 48, and an inner conductor 43d connected to the central core 49.

In this way, an electromagnetic field is generated between the outside wall 48 and the central core 49, such that the wave confinement volume 42 is an annular space lying radially between the outer wall 48 and the central core 49. This volume 42 is also defined axially by the ends 49a and 49b of the central core, since the electromagnetic field decreases very quickly beyond the two ends 49a and 49b of the central core.

Also, the end 48a of the outside wall 48 communicates with an orifice 45 which constitutes the gas inlet to the wave confinement volume 42, and the entire section inside said wall 48 is occupied at the end 49b of the central core by a porous plate 46 of sintered silica which constitutes the gas outlet from the wave confinement volume 42.

The catalyst 44 forms a layer which is disposed against the sintered silica plate 46 inside the wave confinement volume 42, said layer of catalyst occupying the entire inside section of the wall 48 around the central core 49.

Finally, the outside wall 48 extends beyond the sintered silica plate 46 defining a gas collecting chamber 50 that communicates with one or more outlet orifices 51 formed in the end 48b of the outside wall of the vessel.

The tube type heat exchanger 47 is disposed around the wall 48 over the gas collecting chamber 50 and in thermal contact with said wall 48 so as to quench the gas immediately after it has passed through the catalyst 44.

As in the preceding examples, this tubular heat exchanger could optionally be disposed inside the gas collection chamber 50.

Figure 5:
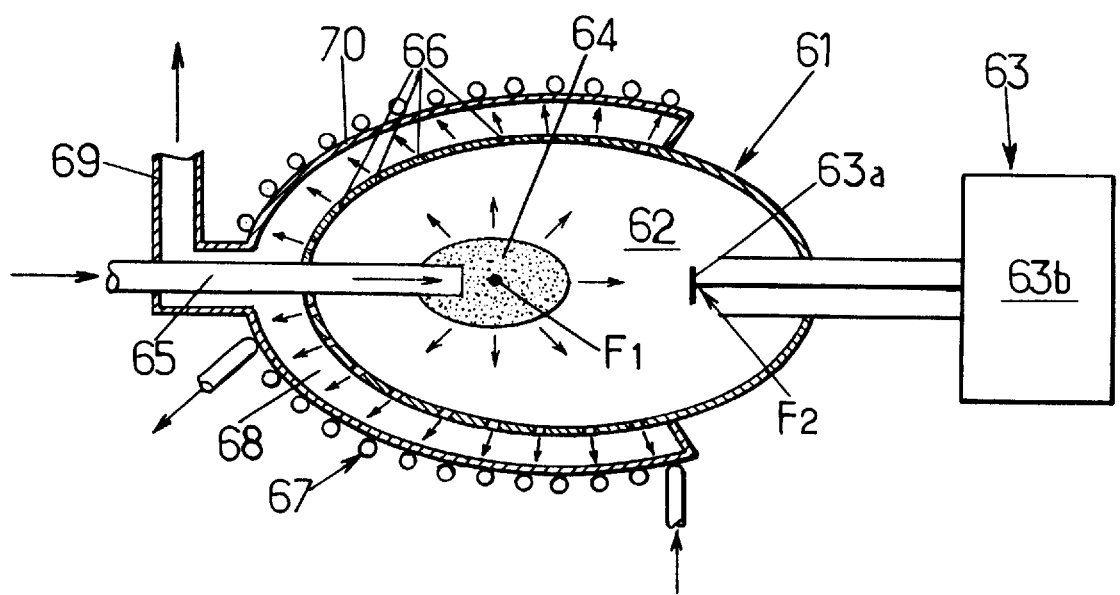
FIG. 5 is a diagrammatic longitudinal section view of a reactor comprising a fourth embodiment of the invention.

In the embodiment of FIG. 5, the vessel 61 is constituted by a metal wall in the form of an ellipsoid of revolution, having two focuses F1 and F2 and defining internally the wave confinement volume 42.

A mass of catalyst 64 is disposed around one of the focuses F1 and is fixed at the end of a duct 65 constituting the inlet for feeding gas into the wave confinement volume.

An antenna 63a is disposed at the second focus F2 of the ellipsoid and is connected to the high frequency electricity generator 63b, the antenna and the generator constituting the wave generator means 63 of the reactor.

The vessel 61 is also pierced by orifices 66 constituting the gas outlet from the wave confinement volume 62, said orifices 66 opening out into a gas collection chamber 68 provided with an outlet orifice 69.

The gas collection chamber 68 is defined on the outside by a metal wall 70 which is continuously connected to the vessel 61 and which is surrounded by the tube type heat exchanger 67 which is in contact therewith so as to quench the hot gas leaving the orifices 66.

Finally, as in the preceding examples, the heat exchanger 67 could optionally be located inside the gas collection chamber 68.

We claim:

1. A gas phase catalytic reactor, comprising:

a metal vessel defining at least part of a wave confinement volume;

wave generation means for emitting electromagnetic waves into said confinement volume at a frequency greater than 10 MHz;

a porous dielectric catalyst disposed in said wave confinement volume, said catalyst being adapted to heat by absorbing energy coming from said electromagnetic waves;

a gas inlet for injecting a reactive gas into the wave confinement volume; and a gas outlet communicating with the wave confinement volume, the reactor being shaped so that all of the reactive gas injected via the above-mentioned gas inlets passes through the catalyst before leaving via the gas outlet, said reactor further including a heat exchanger device disposed outside the wave confinement volume immediately downstream from the gas outlet and adapted to cool the gas suddenly by transferring heat to a cooling liquid, at least once the gas has left the wave confinement volume, and the gas outlet is shaped so as to avoid heating the vessel in the presence of electromagnetic waves generated in the wave confinement volume.

2. A reactor according to claim 1, in which the catalyst is disposed immediately upstream of the gas outlet from the wave confinement volume.

3. A reactor according to claim 1, in which the vessel extends along a longitudinal axis between two ends and comprises:

a substantially tubular outside metal wall extending along the longitudinal axis between the two ends of the vessel, said outside wall having, substantially halfway between said two ends, an annular central length provided with slots which are parallel to the longitudinal axis and which constitute the gas outlet from the wave confinement volume, said central length of the outside wall being surrounded by a gas collecting chamber in thermal contact with the heat exchanger device, which is itself disposed around said central length of the outside wall;

an inside metal core which is disposed substantially in the center of the outside wall and which also extends along the longitudinal axis between the two ends of the vessel, the core presenting a hollow central length in the central length of the outside wall and provided with openings which constitute the gas inlet to the wave confinement volume, the core of the vessel being hollow between its central length and one of the ends of the vessel and defining a gas feed duct which communicates with said enlarged central portion of the core, and the core of the vessel having an electrical length equivalent to half the wavelength of the electromagnetic waves generated in the vessel; and two metal end walls which connect together the core and the outside wall of the vessel at the two ends of said vessel;

the wave confinement volume being an annular space extending radially between the outside wall and the core of the vessel, the catalyst being disposed between said central lengths of the core and of the outside wall of the vessel, and the wave generator means including an electrical generator which is connected to the vessel via a coaxial cable having an outer conductor connected to the outside wall of the vessel and an inner conductor connected to the core of the vessel.

4. A reactor according to claim 3, in which the core of the vessel is wound helically at either end of its central length, such that the total length of the vessel is much shorter than half the wavelength of the electromagnetic waves generated inside said vessel.

5. A reactor according to claim 3, in which the catalyst extends axially between two radial annular plates that interconnect in sealed manner the core of the vessel and the outside wall of said vessel, the two annular plates being made of a dielectric material that is transparent to the electromagnetic waves generated in the wave confinement volume.

6. A reactor according to claim 1, in which:

the vessel is a rectangular section waveguide having an inside space constituting the wave confinement volume and including two narrower faces and two wider faces, one of the narrower faces referred to as the outlet face having slots each extending parallel to the width of said outlet face and constituting the outlet from the wave confinement volume, said slots opening out into a gas collection chamber in thermal contact with the heat exchanger device which is disposed at least facing said slots;

the catalyst is disposed inside the waveguide as a layer covering the outlet face of the waveguide, at least over the slots; and the wave generation means are designed to generate electromagnetic waves presenting an electric field parallel to the slots of the outlet face.

7. A reactor according to claim 1, in which:

the vessel includes a substantially tubular outside metal wall which extends along a longitudinal axis between first and second ends, said outside wall being disposed around a central metal core which extends along the longitudinal axis between first and second ends respectively close to the first and second ends of the outside wall, the second end of the outside wall extending beyond the second end of the central core;

the wave confinement volume is an annular space which extends between the outside wall and the central core and which is defined axially at one end by the second end of the central core, the outside wall including, at said second end of the central core, an inside section which constitutes the gas outlet from the wave confinement volume;

the outside wall of the vessel presents, in the immediate vicinity of the gas outlet and inside the wave confinement volume, an inside section that is completely occupied by the catalyst, which forms a layer extending radially between the outside wall and the central core of the vessel;

the outside wall of the vessel forms, between its second end and the second end of the central core, a gas collection chamber which is in thermal contact with the heat exchanger device; and the wave generating means comprise a high frequency electrical generator connected to the vessel by a coaxial line having an outer conductor connected to the outside wall of the vessel and an inner conductor connected to the central core of the vessel.

8. A reactor according to claim 7, further including a porous plate of dielectric material which occupies the entire section constituting the gas outlet from the wave confinement volume, said porous plate being disposed directly in contact with the catalyst.

9. A reactor according to claim 1, in which:

the vessel is constituted by a metal wall in the form of an ellipsoid of revolution, having first and second focuses;

the catalyst in the form of a mass of material disposed about the first focus and fed internally by a gas feed duct constituting the gas inlet to the wave confinement volume;

the wave generator means include an antenna disposed substantially at the second focus of the vessel; and the gas outlet from the wave confinement volume opens out into a gas collection chamber which is in thermal contact with the heat exchanger device.

* * * * *